(12) United States Patent
De Leon

(10) Patent No.: US 6,779,772 B2
(45) Date of Patent: Aug. 24, 2004

(54) ADJUSTABLE VEHICLE ATTACHMENT STEM

(76) Inventor: John C. De Leon, 1103 W. Cedar Ln., Arlington Hts, IL (US) 60005

( * ) Notice: Subject to any disclaimer, the term of this patent is extended or adjusted under 35 U.S.C. 154(b) by 0 days.

(21) Appl. No.: 10/341,725

(22) Filed: Jan. 14, 2003

(65) Prior Publication Data

US 2004/0135054 A1 Jul. 15, 2004

(51) Int. Cl.⁷ .............................................. E04G 3/00
(52) U.S. Cl. ...................... 248/476; 248/479; 403/305; 359/871
(58) Field of Search ............................ 248/466, 475.1, 248/476, 480, 479; 403/300, 301, 302, 305, 308; 359/871

(56) References Cited

U.S. PATENT DOCUMENTS

| | | | | |
|---|---|---|---|---|
| 90,746 A | * | 6/1869 | Hartmann | 248/480 |
| 1,031,075 A | * | 7/1912 | Lundin | 403/58 |
| 2,281,234 A | * | 4/1942 | Clark et al. | 74/503 |
| 5,489,080 A | * | 2/1996 | Allen | 248/480 |
| 6,132,051 A | * | 10/2000 | Morell et al. | 359/844 |
| 6,499,851 B1 | * | 12/2002 | Kelly et al. | 359/850 |

* cited by examiner

*Primary Examiner*—Ramon O Ramirez
(74) *Attorney, Agent, or Firm*—Niro, Scavone, Haller & Niro

(57) ABSTRACT

A user adjustable variable axial length vehicle attachment stem is disclosed. The vehicle attachment stem includes a pair of extension elements which connect to a vehicle, such as a motorcycle, on one end and a mirror or other vehicle accessory on the other. The user can adjust the axial length of the stem by screwing in or out a threaded connection between the extension elements, and once the desired length is selected, the connection is secured by a connector, such as a hand adjustable threaded lock or a detent.

4 Claims, 3 Drawing Sheets

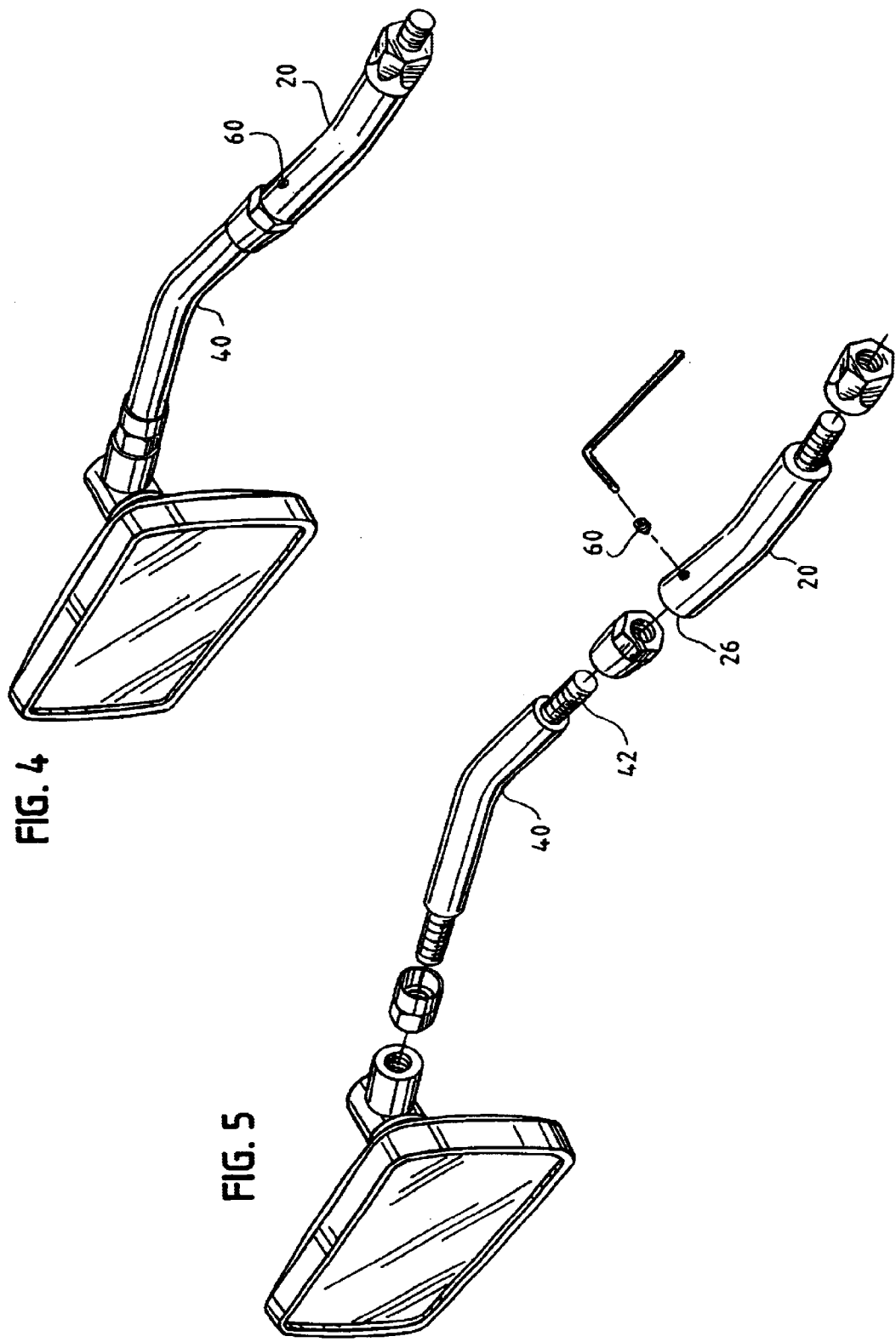

ADJUSTABLE VEHICLE ATTACHMENT STEM

I. FIELD OF THE INVENTION

The invention claimed relates to an adjustable stem for vehicle attachments. More specifically, the preferred embodiments of the claimed invention are particularly directed towards a axial or length adjustable stem for use in vehicle attachments such as a side view mirror on a motorcycle.

II. DESCRIPTION OF THE PRIOR ART

A common problem with existing mirror assemblies in vehicles, particularly motorcycles, is that the design limitations limit the ability of such mirrors to offer a complete rearward view for the vehicle operator. A particular problem in the field of existing motorcycle designs is that their mirror attachments are capable of being rotated in a radial fashion, but do not offer a full range of motion (i.e., such mirror designs can rotate around like a screw, but cannot alter axial direction and/or adjust the length of the axis). This creates operational safety hazards in light of the differences in line of sight for different vehicle operators. For instance, a larger or taller operator might have an optimal line of rearward sight with a mirror assembly that is extend further outward, or with a mirror stem axis projecting more in a perpendicular direction from the body of the motorcycle.

Prior designs in the art do not account for this problem in a simple and efficient manner. A typical prior art approach is shown in U.S. Pat. No. 6,402,330 (Scheidegg). This patent purports to describe a tensioner to provide resistance to the rotation of a shaft or stem relative to a surface from which the shaft originates. Scheidegg, however, does not disclose or suggest the ability to adjust the length of the shaft or the angle at which it projects from the vehicle surface.

Another approach can be seen un U.S. Pat. No. 6,435,684 (Yu). This patent discloses an bulky and unwieldy assembly which cannot be used with stock vehicle mirrors. Specifically, Yu discloses the use of an external side mirror which includes a stem or shaft insertible into the housing of mirror. However, Yu does not facilitate a hand adjustable extension of the length of the stem or shaft, nor does it provide a mirror which has full range of adjustment or rotation relative to the stem to which it is attached. Moreover, Yu does not teach a mirror assembly including a stem whose projection relative to the vehicle is freely rotatable.

III. DEFINITION OF TERMS

The following terms are used in the claims of the patent as filed and are intended to have their broadest meaning consistent with the requirements of law. "extension elements"—two or more components, at least one of which is either integral with or connected to a vehicle (either directly or via a bushing or similar connector), and another of which is either integral with or connected to vehicle attachment (e.g., a mirror), such attachment likewise being integral or through a direct or indirect connection (e.g., through a rotatable connecting element). "axial direction" The line or axis between: 1) the point at which the extension elements connect to the mirror; and 2) the point at which the extension elements connect to the vehicle. Note that while the extension elements project generally along this axis, an given point of an extension element may curve significantly from the axis in order to provide a greater degree of movement upon rotation of the connector elements due to adjustment by the operator. "connector"—a component for connecting two or more extension elements to one another. The means for connecting is most preferably a hand tightened fit which does not require the use of tools to secure the attachment of the extension elements, although alternative tool implemented connectors may also fall within the definition of this term.

Where alternative meanings are possible, the broadest meaning is intended. All words used in the claims set forth below are intended to be used in the normal, customary usage of grammar and the English language.

I. SUMMARY OF THE INVENTION

The apparatus of the present invention comprises an adjustable vehicle attachment stem. The vehicle attachment stem includes a plurality of extension elements which connect to a vehicle on one end and a mirror or other vehicle accessory on the other. The extension elements are preferably designed to connect to stock mirror or other vehicle attachments, and can be either integrally connected to or separably attached to both the vehicle and the vehicle accessory. The extension elements preferably have a threaded engagement with one another, and are adjustably linked to one another via a connector, such as a locknut, which is preferably reciprocally threaded to receive the extension elements. The connector fixes the threaded engagement between the extension elements within a operator adjustable thread range. That is, the invention includes most preferably sufficiently long threaded mating portions on the extension elements such that the stem may be effectively lengthen by one inch or more, while the connector secures the attachment between the extension elements at the desired length, preferably by being manually tightened to engage one of the extension elements.

Accordingly, one object of the present invention is to provide an adjustable vehicle attachment stem which can be used with stock mirrors and other vehicle accessories.

Another object of the present invention is to provide a vehicle attachment stem whose length can be hand adjusted without the need for adjusting tools.

Still another object of the present invention is to provide vehicle attachment stem which has an adjustable axial length yet facilitates the adjustment of a mirror or similar vehicle accessory without regard to the stem axis.

Yet another object of the present invention is to provide an adjustable vehicle attachment stem whereby both the length and the axial direction are user adjustable.

Still another object of the present invention is to provide a more complete rear and/or side view for a vehicle operator to better ensure the vehicle operator's safety.

These and other objects, features, and advantages of the present invention will become more apparent in light of the following detailed description of a best mode embodiment thereof, and as illustrated in the accompanying drawings.

BRIEF DESCRIPTION OF THE DRAWING

FIG. 4 shows a front view, partially cut away, of details of the distal end pitch stud engaging the base of a mirror or similar vehicle accessory.

FIG. 5 shows exposed side view of a second preferred embodiment of an extension element using a tool adjustable detent for assembling the stem of the present invention.

II. DETAILED DESCRIPTION OF THE INVENTION

Set forth below is a description of what is currently believed to be the preferred embodiment or best examples of the invention claimed. Future and present alternatives and modifications to this preferred embodiment are contemplated. Any alternatives or modifications which make insubstantial changes in function, in purpose, in structure or in result are intended to be covered by the claims of this patent.

Figures 1, 2:
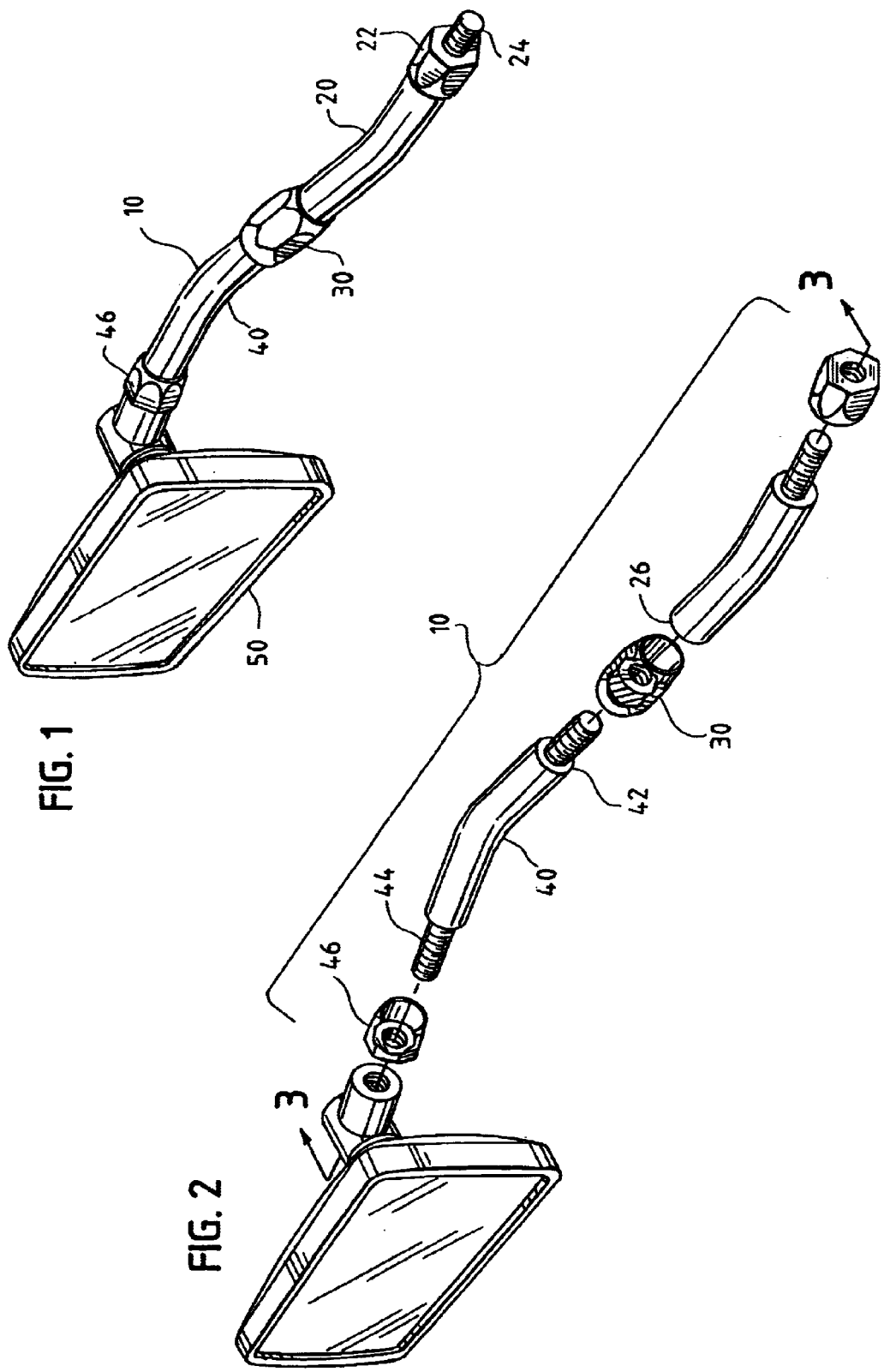
FIG. 1 shows a front view of a preferred embodiment in accordance with the present invention.
FIG. 2 shows an exploded front view, partially cut away of another preferred embodiment in accordance with the present invention.

FIGS. 1 and 2 show a first preferred embodiment of the present invention, comprising the stem 10, which includes a first or proximal extension element 20, a connector 30, and a second or distal extension element 40. The first extension element 20 is designed for mounting, either integrally or by a separable attachment to a vehicle, such as a motorcycle (not shown). The first extension element most preferably includes a first end 22 comprising a male thread with a lock nut 24 mounting surface which adjustably attaches to a reciprocal mount on the vehicle, and a second end 26 comprising a female thread for attaching to the second extension element 40. Likewise, the second extension element includes a first, male threaded end 42 for mating with the connector 30 and the second end 24 of the first extension element 20, as well as a second male threaded end 44 with lock nut 46 for connecting to a vehicle attachment (e.g., a rear view mirror).

In a first preferred embodiment, however, the first and second extension elements 20 and 40 are each three inches in length, ⅝ of an inch in diameter, and are composed of stainless steel tubular shafts which are shaped or curved at their centers to a radius of approximately 25 degrees, although those of ordinary skill in the art will understand that the extension elements can be curved to a greater or lesser degree with departing from the scope of the invention as claimed. Each end of the first and second extension elements are most preferably internally threaded or bored to about 1" inch in length by approximately 10MM in diameter. The term tubular is use to refer to the external shape of a tube, i.e., cylindrical.

In this preferred embodiment, the male threads of the first and second extension elements are comprised of pitch studs into the design for ease of manufacture. Each pitch stud is 1.25" inch in length and ⅜ of an inch in diameter. Pitch studs are preferably inserted or screwed ⅜" of an inch into the ends of the shaft and permanently connected by means of an adhesive, the selection and availability of a specific adhesive being known to those of ordinary skill in the art. One extension element will only utilize 1 of the 3 pitch studs while the other extension element will have the remaining 2 pitch studs attached at each of its ends. Thus, a male thread will project outward to both the vehicle and the mirror or other vehicle attachment, but a male female connection will be created as between the first and second extension elements. Those of ordinary skill in this field will understand that the present invention may also be practiced through alternative embodiments, such as male threads integrally manufactured and machined (i.e., instead of pitch studs) to arrive at the same function and result as this embodiment.

The invention further comprises the use of a connector 30. The connector 30 is most preferably a hexagon shaped locknut which includes an outer or gripping surface 32 and an inner threaded surface 34. The connector 30 is disposed between the first and second connector elements, 20, 40 to accommodate the user with a hand adjustable connection. In other words, to operate this preferred embodiment of the present invention, The connector 30 is screwed onto the male thread of a extension element (located in the example of FIGS. 1 and 2 on the first end 42 of second extension element 40), with that male thread then mating with the reciprocal female thread 26 of the first extension element 20.

Figure 3:
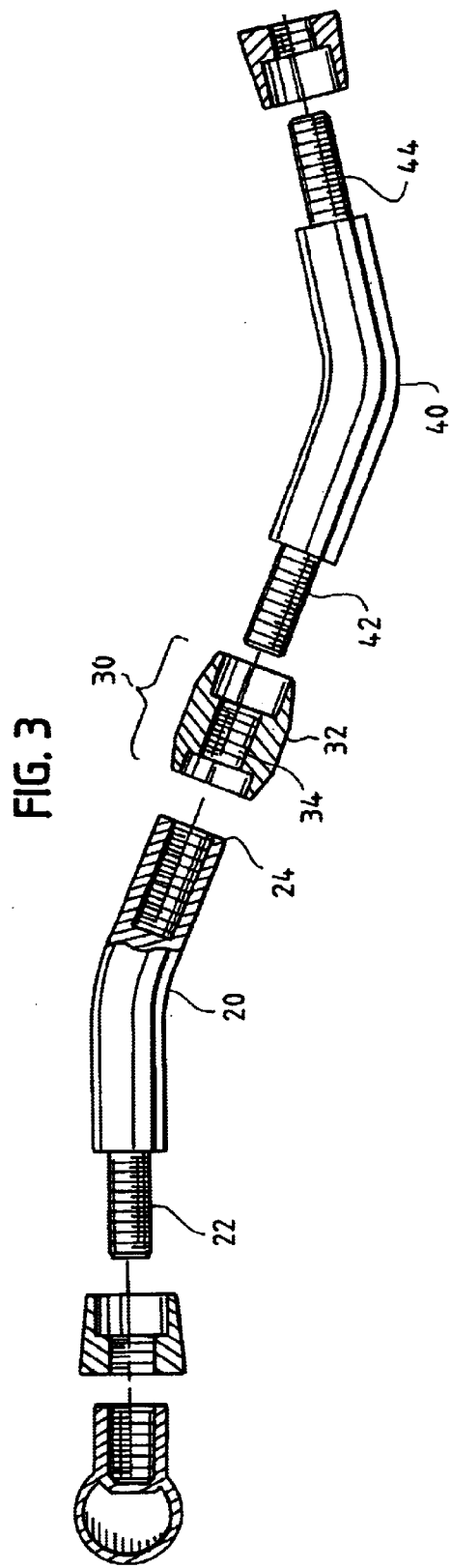
FIG. 3 shows a front view, partially exposed of the engagement between the connector and the extension elements.

The connector 30 and the first and second extension elements 20, 40 are then attached (screwed) together to create the stem 10. The user then connects the stem 10 to a vehicle, such as a motorcycle (not shown) by screwing it onto the handlebars or breaking apparatus. As shown in FIGS. 3 and 4, The most preferred invention further includes the use of lock nuts (connector 30 and lock nuts 24 and 46) to facilitate the connection of the extension elements. Most preferably, 3 lock nuts are incorporated into the design for the purpose of connecting the extension elements together, allowing the stem to be attached on the first end 22 of the first extension element 20 to a vehicle, such as the handlebars or braking apparatus located on the handlebars of the motorcycle. At the second or distal end of the stem, a similar pitch stud and lock nut combination provides a way for a vehicle attachment (e.g., a mirror) to be attached to the stem via the pitch stud. A mirror 50 is attached (screwed) onto the stem and its position can be changed by rotating the mirror and securing its position, within limits, by tightening the locknut accordingly. The connector 30 and the locknut 24 on the first end 22 of the first extension element 20 allow the user to rotate or adjust the height of the stem by rotating the shafts according and then securing the desired position or height by tightening the locknut(s) accordingly.

Accordingly, the operator can, when desired, increase or decrease the axial length of the stem by either rotating the first extension element or second extension element 20, 40 independently of one another other in a radial direction or, together as preferred. That is, the first connector element 20 can be rotated in a radial direction (i.e., further screwed in or out) from its connection with the vehicle in and then secured by tightening the locknut 24 as desired. Additionally, the user has the ability to rotate the second extension element 40 in a radial direction, independently of the first extension element 20 and securing the desired position by tightening the connector 30 accordingly. Through the use of the curved or shaped extension elements 20, 40, the operator may be able to adjust the effective angle of the stem relative to the vehicle as well as its axial length.

Features of a second preferred embodiment of the invention are shown in FIG. 5. In this embodiment, the connector 30 is replaced with a detent connector 60, which extends radially through the second end 26 of the first extension element 20. This detent connector preferably is about 3/16" of an inch in length, and consists of a male thread which mates with a reciprocal female thread extending through the radial wall of the first extension element 20. Once the male thread 42 of the second extension element 40 is mated to the female thread of the second end 24 of the first extension element 20 to a desired length, the detent connector 60 may be radially tightened (i.e., by means of an allen wrench) to secure the user adjusted connection of the extension elements.

In all of the preferred embodiments described above, the disclosed features enhance the operator or rider path of rear view sight when looking into the side mirror(s), either when changing seating positions or, when the attached mirror cannot be further twisted or adjusted as preferred due to design limitations.

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims. For instance, the selection of which extension element uses a "male thread" versus a female thread is for illustrative purposes with reference to the example drawings only. Likewise, it will be appreciated by those skilled in the art that various changes, additions, omissions, and modifications can be made to the illustrated embodiments without departing from the spirit of the present invention. All such modifications and changes are intended to be covered by the following claims.

What is claimed is:

1. A vehicle attachment stems, said stem comprising:
   a) a pair of generally tubular extension elements extending generally along an axial direction, said pair of extension elements being adjustably connected to one another via a threaded engagement;
   b) a connector movable in an axial direction relative to the axial direction of tubular extension members, said connector further comprising threaded portions and a gripping portion, said threaded portions for mating between said extension elements in an axial direction, and said gripping portion for facilitating a hand tightened fit without the use of a tool with said extension elements, wherein the threaded connector secures a user selected length of said stem in said axial direction and a user selected radial orientation of said stem relative to said axial direction.

2. The vehicle attachment stem of claim 1, wherein said stem is a mirror stem.

3. The vehicle attachment stem of claim 1, wherein said stem is a motorcycle mirror stem.

4. A motorcycle mirror stem, said stem comprising:
   a) a pair of generally tubular extension elements extending generally along an axial direction, said pair of extension elements being adjustably connected to one another via an axial threaded engagement, wherein one of the tubular extension member has a male thread, and the other a female thread;
   b) a detent connector for said extension elements, said detent connector extending radially through at least one of said extension elements for providing a user adjustable friction fit with said axial threaded engagement, whereby the detent connector secures a user selected axial length and radial orientation of said stem.

* * * * *